(12) United States Patent
Nye

(10) Patent No.: US 9,440,342 B2
(45) Date of Patent: Sep. 13, 2016

(54) FASTENER EXTRACTION RATCHET BIT DEVICE

(71) Applicant: Kevin D. Nye, Meeker, CO (US)

(72) Inventor: Kevin D. Nye, Meeker, CO (US)

( * ) Notice: Subject to any disclaimer, the term of this patent is extended or adjusted under 35 U.S.C. 154(b) by 312 days.

(21) Appl. No.: 14/303,666

(22) Filed: Jun. 13, 2014

(65) Prior Publication Data

US 2015/0360356 A1 Dec. 17, 2015

(51) Int. Cl.

| | |
|---|---|
| *B25B 27/18* | (2006.01) |
| *B23B 51/08* | (2006.01) |
| *B25B 21/02* | (2006.01) |
| *B23B 31/00* | (2006.01) |

(52) U.S. Cl.
CPC ............. *B25B 27/18* (2013.01); *B23B 31/005* (2013.01); *B23B 31/008* (2013.01); *B25B 21/02* (2013.01); *B23B 2231/0208* (2013.01); *B23B 2251/64* (2013.01)

(58) Field of Classification Search
CPC .............. B23B 31/005; B23B 31/008; B23B 2251/02; B23B 2251/64; B23B 51/08; B25B 27/18; B25B 21/02
See application file for complete search history.

(56) References Cited

U.S. PATENT DOCUMENTS

| | | | | |
|---|---|---|---|---|
| 2,512,033 | A * | 6/1950 | Metz | B23B 31/006 |
| | | | | 29/402.08 |
| 2,670,639 | A * | 3/1954 | Flowers | B25B 27/18 |
| | | | | 29/240 |
| 3,861,250 | A * | 1/1975 | Zugai | B25B 21/00 |
| | | | | 29/426.5 |
| 4,062,078 | A | 12/1977 | Brutschy | |
| 4,713,990 | A | 12/1987 | Poling | |
| 4,777,850 | A * | 10/1988 | Polonsky | B25B 27/18 |
| | | | | 408/226 |
| 4,818,157 | A * | 4/1989 | Kouvelis | B23B 31/005 |
| | | | | 279/145 |
| 5,074,025 | A * | 12/1991 | Willard, III | B23B 31/005 |
| | | | | 279/103 |
| 5,222,848 | A | 6/1993 | Kuang-Wu | |
| 5,328,308 | A * | 7/1994 | Ducker, III | B23B 31/005 |
| | | | | 407/30 |
| 5,405,221 | A * | 4/1995 | Ducker, III | B23B 31/005 |
| | | | | 279/83 |
| 5,722,805 | A | 3/1998 | Giffin | |
| 6,572,311 | B2 * | 6/2003 | Vasudeva | B23B 31/005 |
| | | | | 408/226 |
| 6,742,416 | B2 | 6/2004 | Bergamo | |
| 7,007,573 | B2 * | 3/2006 | Kozak | B25B 13/065 |
| | | | | 30/167 |
| D626,575 | S | 11/2010 | Washington, III | |
| 8,132,990 | B2 * | 3/2012 | Bauman | B23B 31/008 |
| | | | | 279/137 |
| 8,955,415 | B2 * | 2/2015 | Lin | B25B 27/18 |
| | | | | 81/441 |
| 2005/0204542 | A1 * | 9/2005 | Pittman | B23B 47/284 |
| | | | | 29/566 |
| 2005/0247165 | A1 * | 11/2005 | Arriens | B25B 27/18 |
| | | | | 81/53.2 |
| 2006/0060031 | A1 * | 3/2006 | Morris | B25B 27/18 |
| | | | | 81/53.2 |
| 2006/0228181 | A1 * | 10/2006 | Kozak | B23B 31/005 |
| | | | | 408/239 R |
| 2008/0075549 | A1 * | 3/2008 | Kozak | B23B 31/005 |
| | | | | 408/226 |
| 2014/0183827 | A1 * | 7/2014 | Keightley | B23B 31/005 |
| | | | | 279/30 |
| 2015/0075331 | A1 * | 3/2015 | Catalano | B25B 27/18 |
| | | | | 81/53.2 |

* cited by examiner

*Primary Examiner* — David B Thomas

(57) ABSTRACT

A fastener extraction ratchet bit system for facilitating extraction of stripped fasteners by permitting attachment of extraction bits to an air drive ratchet. The system includes a driving tool and a fitting coupled to and extending from the driving tool. A drill socket is coupled to a drill bit wherein the drill bit is selectively couplable to the fitting such that the driving tool provides a driving force to the drill bit. An extraction socket is coupled to an extraction bit wherein the extraction bit is also selectively couplable to the fitting such that the driving tool provides the driving force to the extraction bit.

5 Claims, 4 Drawing Sheets

FASTENER EXTRACTION RATCHET BIT DEVICE

BACKGROUND OF THE DISCLOSURE

Field of the Disclosure

The disclosure relates to bit systems and more particularly pertains to a new bit system for facilitating extraction of stripped fasteners by permitting attachment of extraction bits to an air drive ratchet.

SUMMARY OF THE DISCLOSURE

An embodiment of the disclosure meets the needs presented above by generally comprising a driving tool and a fitting coupled to and extending from the driving tool. A drill socket is coupled to a drill bit wherein the drill bit is selectively couplable to the fitting such that the driving tool provides a driving force to the drill bit. An extraction socket is coupled to an extraction bit wherein the extraction bit is also selectively couplable to the fitting such that the driving tool provides the driving force to the extraction bit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
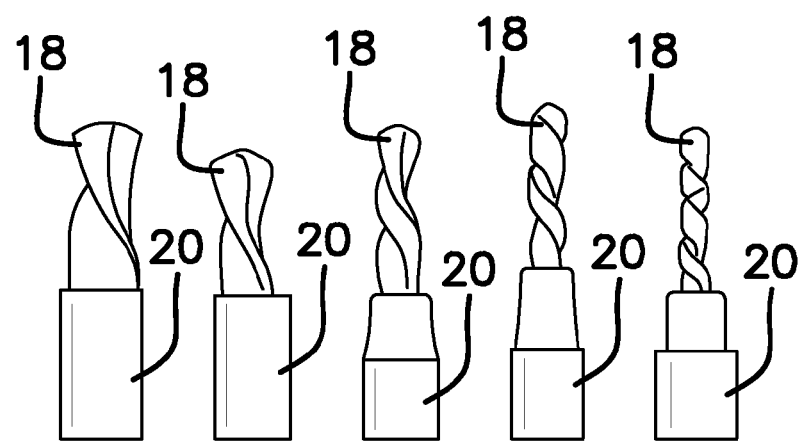
FIG. 1 is a front view of extraction bits of a fastener extraction ratchet bit system according to an embodiment of the disclosure.
Figure 2:
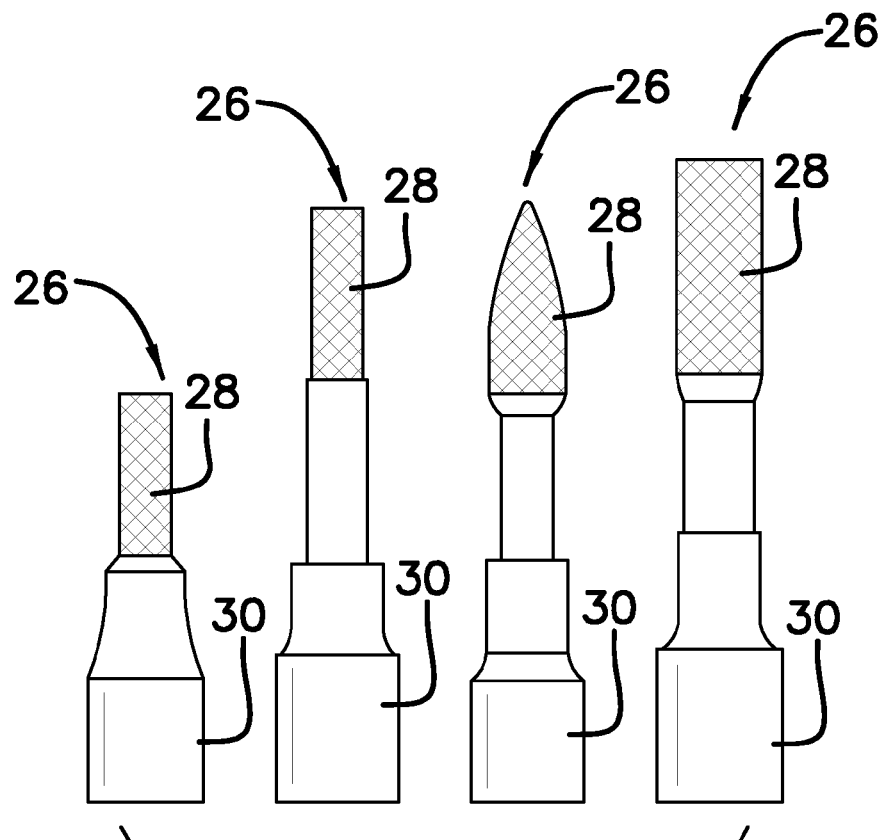
FIG. 2 is a front view of bun bits of an embodiment of the disclosure.
Figure 3:
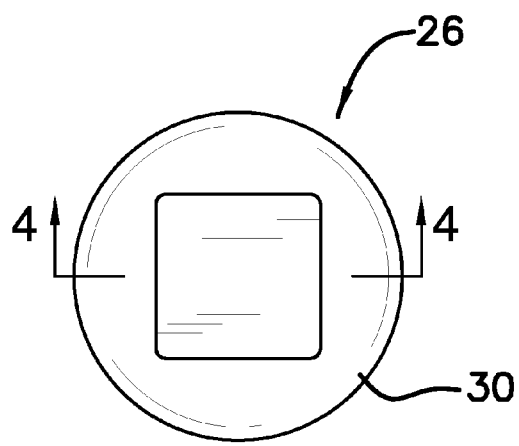
FIG. 3 is a bottom view of a ratchet socket of a bit of an embodiment of the disclosure.

With reference now to the drawings, and in particular to FIGS. 1 through 6 thereof, a new bit system embodying the principles and concepts of an embodiment of the disclosure and generally designated by the reference numeral 10 will be described.

As best illustrated in FIGS. 1 through 6, the fastener extraction ratchet bit system 10 generally comprises a driving tool 12. The driving tool 12 is an impact wrench 14 such that the driving tool 12 is positionable in an enclosed or otherwise difficult to access space. A fitting 16 is coupled to and extends from the driving tool 12. The fitting 16 may be of conventional design for socket tools. Each of a plurality of drill bits 18 has a unique diameter. A respective drill socket 20 is coupled to each drill bit 18 wherein the each drill bit 18 is selectively couplable to the fitting 16 such that the driving tool 12 provides a driving force to the drill bit 18. The driving tool 12 may provide for reversing the direction of the driving force in a conventional manner. The drill bits 18 each have a relatively short length to facilitate positioning of the drill bit 18 into a tight space with the driving tool 12. The driving tool 12 is actuated to allow a selected attached drill bit 18 to bore into a head 22 of a stripped fastener 24. Each size of drill bit 18 may be produced having a right hand or a left hand twist. The system 10 may be provided with a right hand twist and a separate left hand twist for each unique size of drill bit 18.

Figure 4:
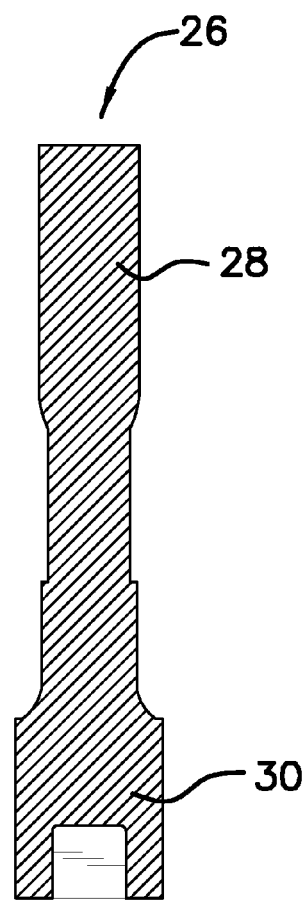
FIG. 4 is a cross-sectional view of an embodiment of the disclosure taken along line 4-4 of FIG. 3.
Figure 5:
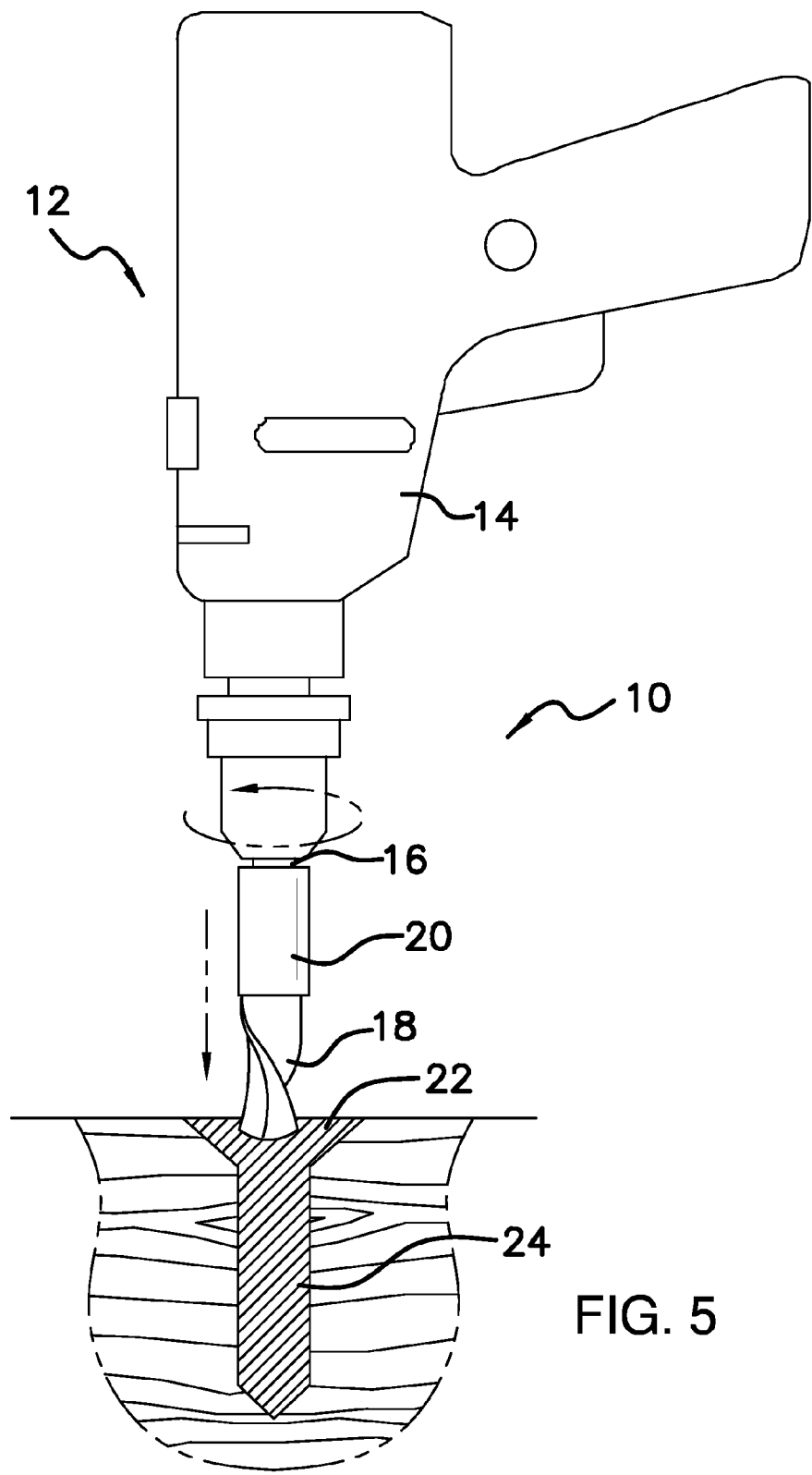
FIG. 5 is a cut-away side view of an embodiment of the disclosure in use.
Figure 6:
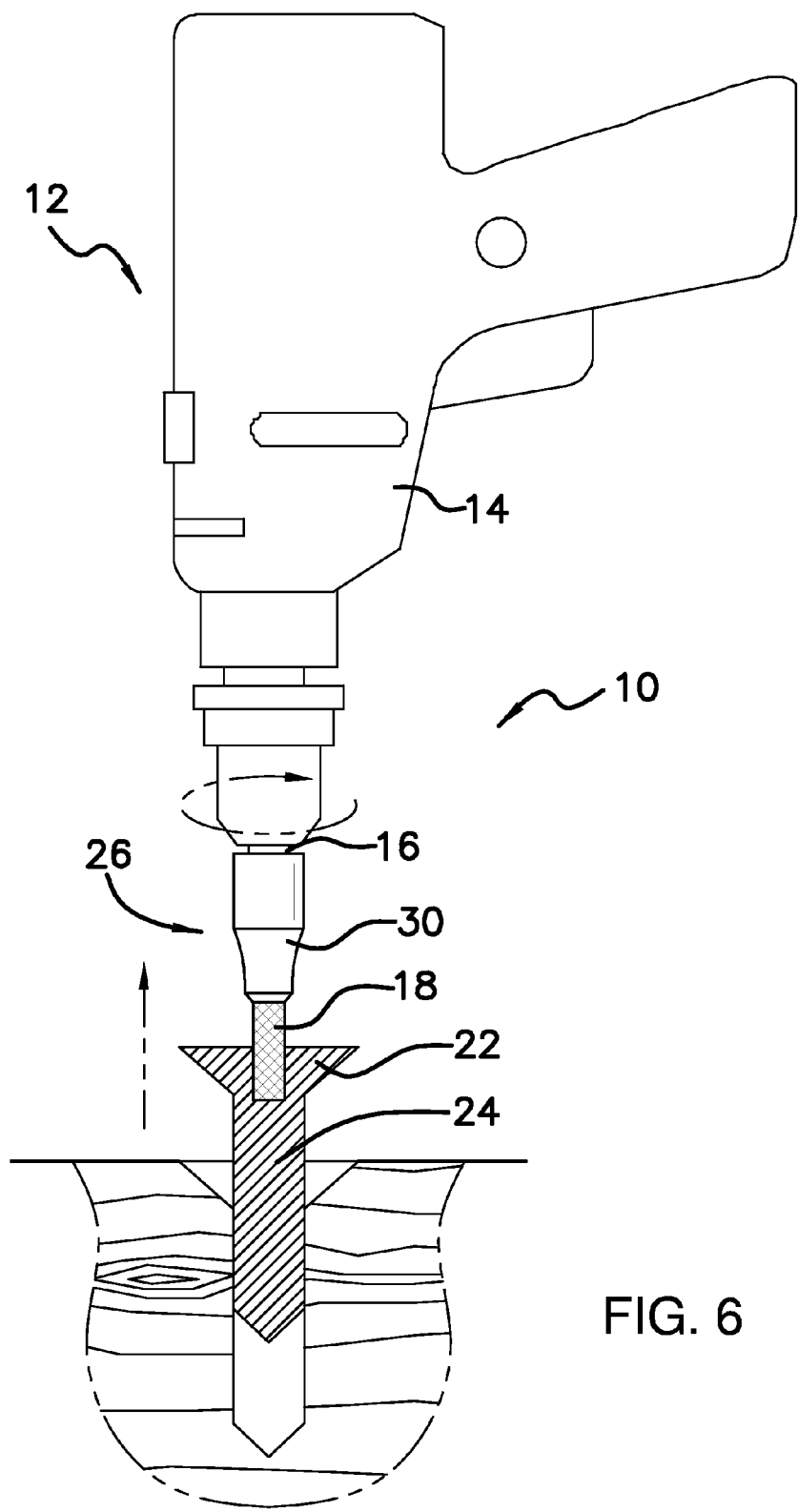
FIG. 6 is a cut-away side view of an embodiment of the disclosure in use.

Each of a plurality of extraction bits 26 has a respective uniquely sized head section 28. The head sections 28 may be consistent with the variety which are conventionally known. A respective extraction socket 30 is coupled each extraction bit 26 wherein each extraction bit 26 is selectively couplable to the fitting 16 such that the driving tool 12 provides the driving force to the extraction bit 26. Each extraction bit 26 may also have a relatively short length to permit positioning of the extraction bit 26 in a tight space for engagement to and removal of the fastener 24. Each extraction bit 26 and extraction socket 30 may be formed from a single piece of material as shown in FIG. 4.

In use, the desired drill bit 18 is coupled to the fitting 16 using the drill socket 20. The drill bit 18 is used to drill into the fastener 24 to remove material from the head 22 and prepare the fastener 24 for being extracted. The desired extraction bit 26 is then coupled to the fitting 16 in place of the drill bit 18. The driving tool 12 is then repositioned to engage the extraction bit 26 to the fastener 24. The driving tool 12 is then actuated wherein the extraction bit 26 extracts the fastener 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A fastener extraction ratchet bit system comprising:
a driving tool;
a fitting coupled to and extending from said driving tool;
a drill bit;

a drill socket coupled to said drill bit wherein said drill bit is selectively couplable to said fitting such that said driving tool provides a driving force to said drill bit; an extraction bit;

and an extraction socket coupled to said extraction bit wherein said extraction bit is selectively couplable to said fitting such that said driving tool provides said driving force to said extraction bit.

2. The system of claim 1, further comprising a plurality of said drill bits, each of said drill bits having a unique diameter.

3. The system of claim 1, further comprising a plurality of said extraction bits, each of said extraction bits having a respective uniquely sized head section.

4. The system of claim 1, further comprising said driving tool being an impact wrench.

5. A fastener extraction ratchet bit system comprising:

a driving tool, said driving tool being an impact wrench;

a fitting coupled to and extending from said driving tool;

a plurality of drill bits, each of said drill bits having a unique diameter;

a respective drill socket coupled to each said drill bit wherein said each said drill bit is selectively couplable to said fitting such that said driving tool provides a driving force to said drill bit;

a plurality of extraction bits, each of said extraction bits having a respective uniquely sized head section; and a respective extraction socket coupled to each said extraction bit wherein each said extraction bit is selectively couplable to said fitting such that said driving tool provides said driving force to said extraction bit.

\* \* \* \* \*